July 29, 1924.
H. T. COX
1,502,940
AUTOMOBILE DIRECTION INDICATOR
Filed April 8, 1921    2 Sheets-Sheet 1
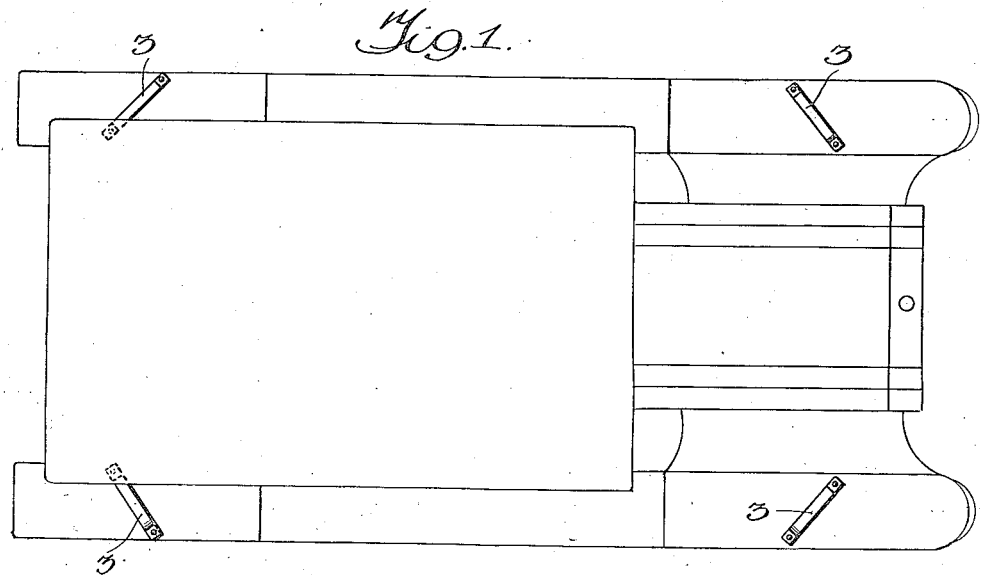
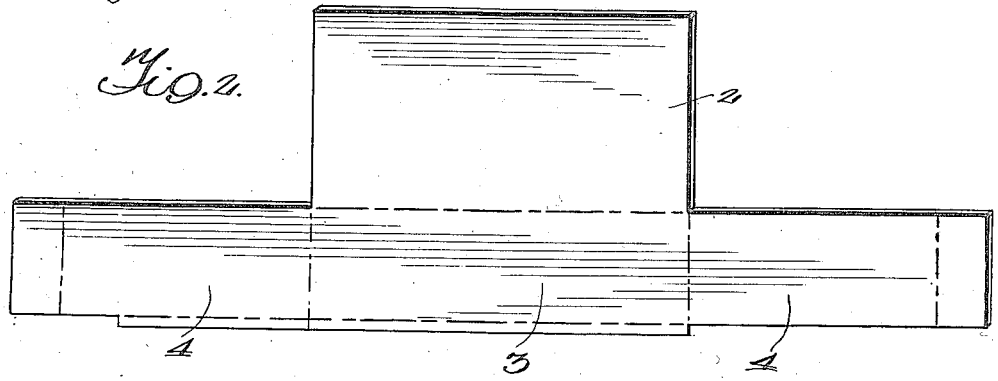
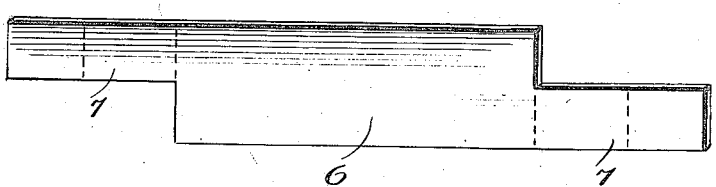
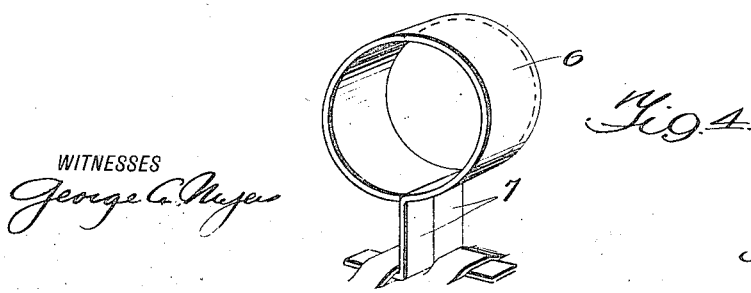
WITNESSES
INVENTOR
H. T. Cox,
BY
ATTORNEYS July 29, 1924.
H. T. COX
AUTOMOBILE DIRECTION INDICATOR
Filed April 8, 1921      2 Sheets-Sheet 2
1,502,940
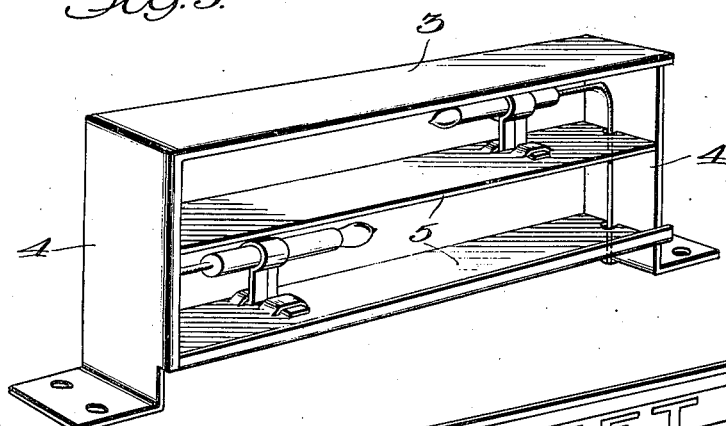
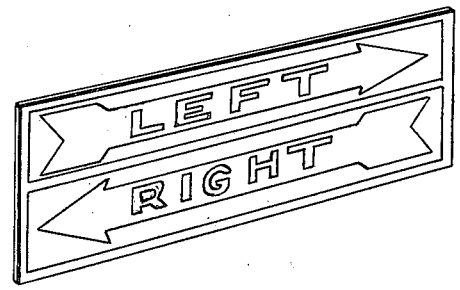
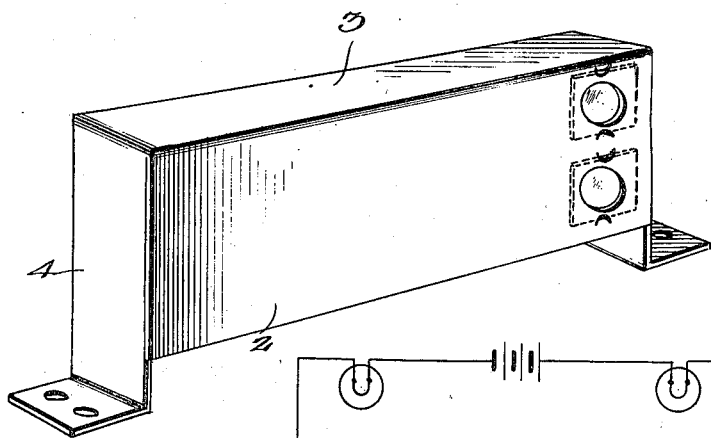
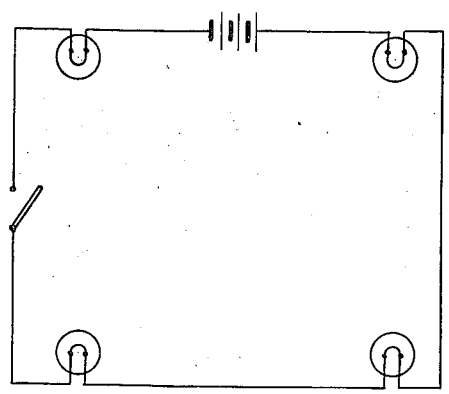
WITNESSES
INVENTOR
H. T. COX,
BY
ATTORNEYS Patented July 29, 1924.

1,502,940

UNITED STATES PATENT OFFICE.

HERBERT THOMAS COX, OF LONG BEACH, CALIFORNIA.

AUTOMOBILE DIRECTION INDICATOR.

Application filed April 8, 1921. Serial No. 459,786.

*To all whom it may concern:*

Be it known that I, HERBERT THOMAS Cox, a citizen of the United States, and a resident of Long Beach, in the county of Los Angeles and State of California, have invented certain new and useful Improvements in Automobile Direction Indicators, of which the following is a specification.

My invention relates to electrically operated automobile-direction indicators for affording pedestrians and operators of other cars an indication of the direction in which it is intended to steer the car having the indicator installed thereon.

An object of my invention is to provide an indicator of the above character which can be easily and cheaply manufactured out of sheet metal, which will be strong and durable in use, and which will not mar the beauty of outline of the most artistic car.

A further object of the invention is to provide an indicator consisting of a plurality of units which are so located and positioned with respect to the car that an indication will be given at all points of the compass, to the end that the greatest possible insurance against accidents may be had by making the indications visible at all angles of view. I regard this as a very important object attained by my invention, for an automobile direction indicator, in order to perform its function perfectly, should afford an indication not only to persons located in front and in rear of the car but also to those located abreast or oblique thereto.

The means by which I attain the above objects will be disclosed in the following description with reference to the accompanying drawings which form a part of this specification.

In said drawings:

Figure 1 is a top plan view of an automobile having my invention applied thereto;

Figure 2 is a view of a blank from which the indicator casing is formed;

Figure 3 represents a blank form which the lamp holder is formed;

Figure 4 is a view of the lamp holder, showing the method of its attachment in the casing;

Figure 5 is a perspective view of a complete indicator unit with the front thereof removed;

Figure 6 is a rear view of the indicator unit;

Figure 7 shows the removable front of the indicator; and

Figure 8 is a diagrammatic view of the circuit connections.

Referring to Figures 2, 5 and 6, the indicator consists of an elongated sheet metal casing substantially rectangular in form. The top, back, sides and supporting means of the indicator are formed from a single blank of sheet metal of the outline shown in Figure 2. Part 2 of said blank is bent at right angles to part 3 to form the back wall of the indicator, the sides of the indicator being formed by bending down the parts 4, the ends of part 4 being bent to form substantially horizontal foot portions. Holes are punched in the latter to provide means of attachment to the fender of the automobile.

The numeral 5 designates upper and lower shelves attached in the casing just described and forming therewith upper and lower longitudinal compartments, there being a lamp holder and a lamp attached in each compartment. The lamp holder is conveniently formed of a single blank of sheet metal represented by Figure 3, the blank being bent to provide the tubular body 6 for receiving the lamp stem and separate leg portions 7 terminating in horizontally extending foot portions. Each shelf 5 has cut therein two pairs of slits, and the metal between said slits is upset to form two pairs of slots, through which are passed the horizontal foot portions of the lamp as clearly shown in Figures 4 and 5.

The lamp stems, on the inner ends of which are mounted bulbs, are relatively long so as to position said bulbs centrally of the compartments in order to provide uniform illumination of the indicating slides. The latter consists of a single glass slide or pane on the inner face of which are defined upper and lower indications corresponding to the compartment openings. The indication which I prefer to employ consist of a pair of arrows pointing in opposite directions and having the words Left and Right thereon, respectively. The arrows may be defined by painting the same in translucent paint on the inner face of the glass pane, the letters being formed of translucent material of a different color from that of the arrow. Preferably, the arrows are in red surrounded by a narrow white border and the letters are in white, the surface beyond the border of the arrows being rendered opaque to cut out other rays. The outer faces of the panes are ground in order to render the indications substantially invisible in day light and to defuse the light transmitted therethrough from the lamps so as to prevent glaring effects.

In order to make the front glass of the indicator readily removable for repair and to provide a convenient holding means therefor, I bend the upper edge of the top 3 downwardly, the edge of one of the sides 4 inwardly and the edge of the lower shelf upwardly, thereby forming tracks for guiding and holding the glass. The glass may be held in position by any suitable means such as a clip or button attached to the side and adapted to overlap the end of said glass.

As shown in Figure 1 an indicator unit of the above construction is attached to the crests of each fender and disposed at an angle of 45° to the fore and aft line thereof. This arrangement renders the indicator visible from all angles of view as will be readily understood. The lamps in corresponding compartments of all the indicators are connected in series in the same circuit, as indicated in Figure 8, that is to say, the lamps in the upper compartments which give the same indication are connected in one circuit and the lamps in the lower compartments which give the opposite indication are connected in an independent circuit, each circuit being controlled by a suitable switch located within convenient reach of the operator.

As shown in Figure 6, there is a window for each compartment cut in the rear wall thereof and covered by any suitable translucent material. These windows are adapted to act as telltales to indicate the proper operation of the signals and they are, accordingly, provided in one of the front indicators only. As the lights are connected in series, when any one thereof is out of commission or burnt out, the telltale will indicate such fact to the operator.

It will be seen from the above description that I have provided an indicator of very simple construction, which can be manufactured comparatively cheaply as the entire casing is composed of a single blank. The casing is of small dimensions, and, being long and comparatively low and presenting straight lines, it does not interfere with or mar the outlines of the car to which it is attached. Due to the location of the indicators on the fenders and their relative position to each other and to the longitudinal axis of the car the indications are given to observers at all points of the compass. Thus there is provided an indicating system which will give the greatest possible assurance against accidents by failure to observe the indications.

Having particularly described my invention, what I claim as new and desire to secure by Letters Patent is:

1. A casing for direction indicators for use on automobiles constructed of a single piece of metal including a back, a top integral with the back and extending at right angles thereto, depending side walls integral with the top, said side walls each having a foot portion provided with apertures to constitute attaching means, the top and one of the side walls being flanged to provide a support, a bottom secured in the casing and having a flange providing a support complementary to the support of the top and side, a signalling panel for the front of the casing, engaged with the supports of the top side and bottom and signalling means within said casing.

2. In a direction indicator, a casing having metallic partitions therein, each partition having two pairs of horizontal slits and having the metal between each pair upset, and a sheet metal lamp holder consisting of a tubular lamp holder portion, two vertical legs depending therefrom and terminating in horizontal foot portions extended through the slots of the partitions.

HERBERT THOMAS COX.